(12) United States Patent
Kawai

(10) Patent No.: US 7,377,047 B2
(45) Date of Patent: May 27, 2008

(54) MACHINE TOOL WITH WORKPIECE MEASURING INSTRUMENT AND OPERATING METHOD FOR THE SAME

(75) Inventor: Hiroshi Kawai, Inuyama (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 11/581,378

(22) Filed: Oct. 17, 2006

(65) Prior Publication Data

US 2007/0084074 A1 Apr. 19, 2007

(30) Foreign Application Priority Data

Oct. 18, 2005 (JP) ............................ 2005-302801

(51) Int. Cl.
*G01B 3/14* (2006.01)
*G01B 5/20* (2006.01)
(52) U.S. Cl. ............................ 33/551; 33/501; 33/1 M
(58) Field of Classification Search ................ 33/501, 33/503, 1 M, 551
See application file for complete search history.

(56) References Cited

U.S. PATENT DOCUMENTS

| | | | | |
|---|---|---|---|---|
| 4,817,362 A | * | 4/1989 | Archer | 33/832 |
| 4,976,019 A | * | 12/1990 | Kitamura | 29/26 A |
| 6,752,573 B2 | * | 6/2004 | Haller | 409/235 |
| 7,025,543 B2 | * | 4/2006 | Curtis | 409/131 |
| 7,051,449 B2 | * | 5/2006 | Eichner et al. | 33/503 |
| 7,127,825 B2 | * | 10/2006 | McMurtry et al. | 33/556 |
| 7,150,706 B2 | * | 12/2006 | Grob | 483/54 |
| 7,191,540 B1 | * | 3/2007 | Brewer et al. | 33/551 |

FOREIGN PATENT DOCUMENTS

| | | |
|---|---|---|
| DE | 102 07 636 A1 | 9/2003 |
| EP | 0 985 493 A | 3/2000 |
| FR | 2 600 002 A | 12/1987 |
| JP | 02-279277 | 11/1990 |
| JP | 6-126598 A | 5/1994 |
| JP | 07-001294 | 1/1995 |
| JP | 2004-34187 A | 2/2004 |

OTHER PUBLICATIONS

Notification of Reason(s) for Refusal dated Oct. 25, 2007 issued in corresponding Japanese Application No. 2005-302801.
European Search Report dated Feb. 1, 2007 issued in corresponding European patent application No. 06 12 1702.

* cited by examiner

Primary Examiner—Yaritza Guadalupe-McCall
(74) Attorney, Agent, or Firm—Westerman, Hattori, Daniels & Adrian, LLP.

(57) ABSTRACT

The present invention provides a machine tool with a workpiece measuring instrument which prevents the workpiece measuring instrument from being affected by chips or cutting heat during non-machining, while enabling a workpiece W to be measured near a machining position. A machine tool has a bed 9 and a cover 3 surrounding a machining area R. Workpiece supporting means 6, machining means 7, and workpiece measuring instrument 31 are provided in the machining area R. Position switching means 32 is provided which moves the workpiece measuring instrument 31 between a position inside the machining area R and a storage position B outside the machining area R. The workpiece supporting means 6 is movable in a lateral direction. The workpiece measuring instrument 31 is movable forward and backward so as to freely switch its position, and measures the workpiece W.

3 Claims, 6 Drawing Sheets

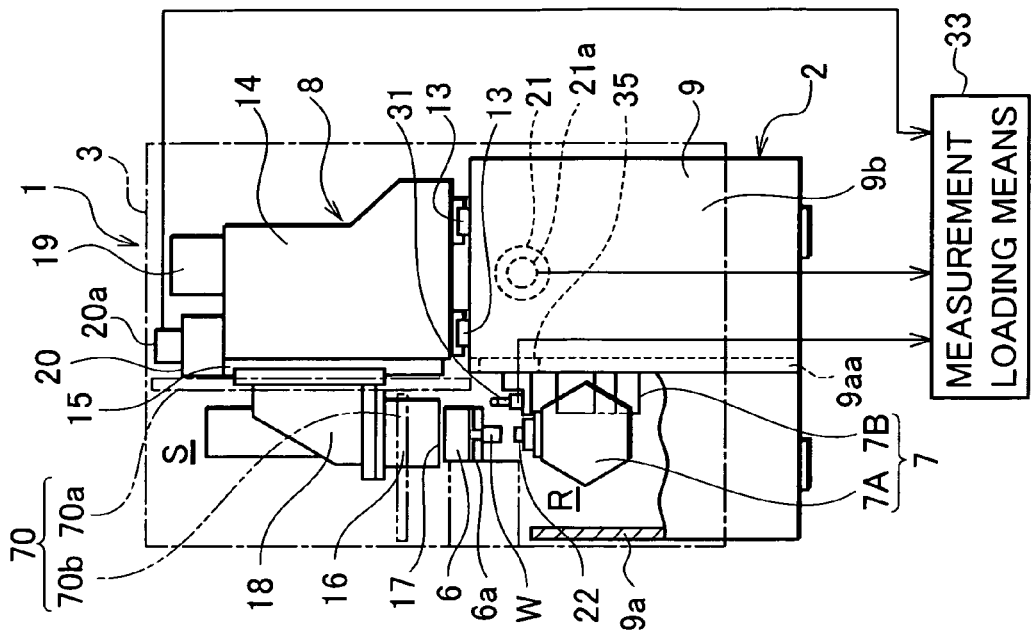
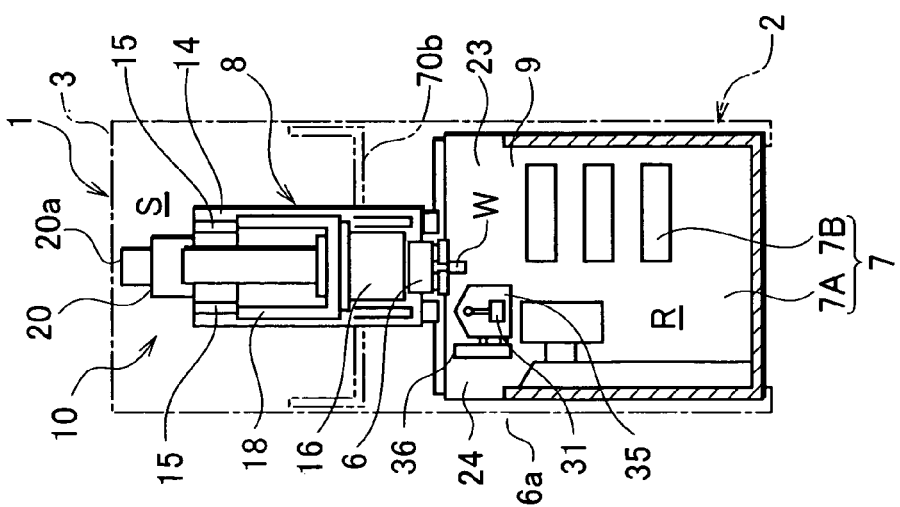

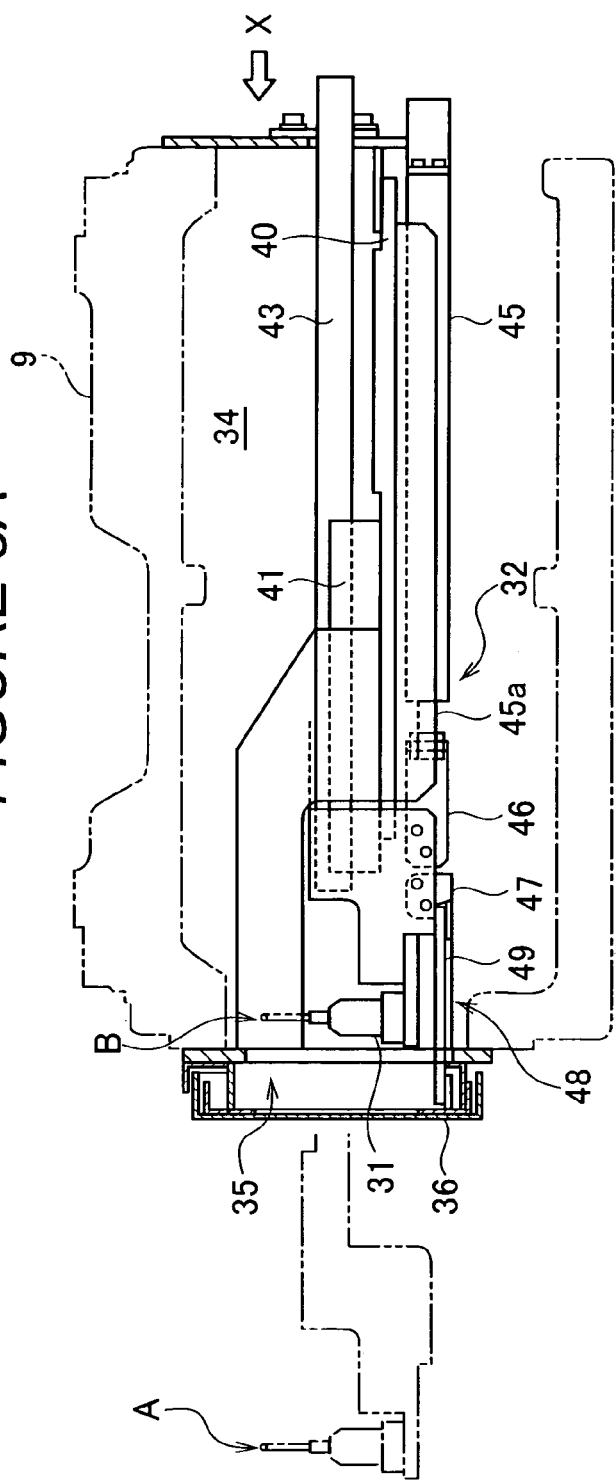
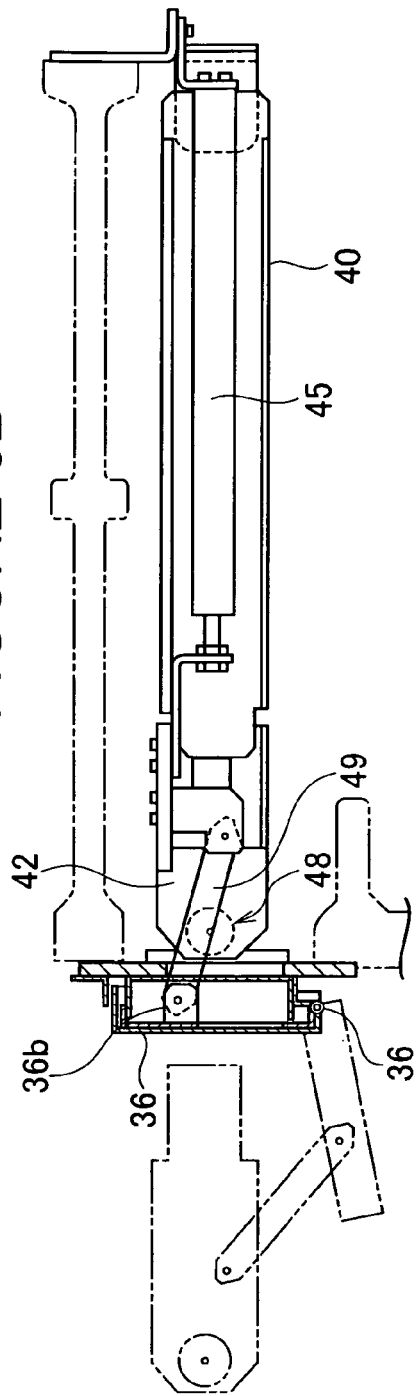

MACHINE TOOL WITH WORKPIECE MEASURING INSTRUMENT AND OPERATING METHOD FOR THE SAME

FIELD OF THE INVENTION

The present invention relates to a machine tool with a workpiece measuring instrument that measures the dimensions of a machined workpiece, and the present invention also relates to an operating method for a machine tool with a workpiece measuring instrument.

BACKGROUND OF THE INVENTION

To improve machining precision, automatic control machine tools use a workpiece measuring instrument to measure the dimensions of a roughly machined workpiece to correct the amount by which a tool is fed during finish machining on the basis of measurements. For example, the Unexamined Japanese Patent Application Publication (Tokkai) 2004-34187 describes an example in which the machine tool is a lathe having, instead of tools, workpiece measuring instruments mounted on some of a plurality of tool stations of a tool stand comprising a turret.

In the Unexamined Japanese Patent Application Publication (Tokkai) 2004-34187, the workpiece measuring instruments are mounted on the tool stand and located near a machining position during workpiece machining. Consequently, chips resulting from cutting may adhere to the workpiece measuring instruments to affect their detection precision. Machining vibration may also propagate to the workpiece measuring instruments, which may thus fail. The workpiece measuring instruments located near the machining position are also likely to be affected by cutting heat, and the workpiece measuring instruments may become hot and defective or have their functions degraded.

An object of the present invention is to provide a machine tool with a workpiece measuring instrument which prevents the workpiece measuring instrument from being affected by chips or cutting heat during non-machining, while enabling a workpiece to be measured near a machining position. Another object of the present invention is to provide a simplified means for switching a position of the workpiece measuring instrument.

SUMMARY OF THE INVENTION

The present invention provides a machine tool with a workpiece measuring instrument having a bed and a cover that surrounds a machining area, the machine tool including workpiece supporting means, machining means for machining a workpiece supported by the workpiece supporting means, a workpiece measuring instrument that measures the dimensions of the machined workpiece, and position switching means for switching the workpiece measuring instrument between a position inside the machining area and a storage position outside the machining area.

With this configuration, the workpiece measuring instrument is located inside the machining area while the workpiece is not being machined, and the workpiece is thus measured near the machining position. During workpiece machining, the workpiece measuring instrument can be retracted to the storage position outside the machining area so as not to be affected by chips or cutting heat. This enables the workpiece measuring instrument to be always kept in appropriate conditions to achieve precise measurements, and the durability of the workpiece measuring instrument is also improved.

According to the present invention, preferably, the workpiece supporting means is movable in a lateral direction, and the workpiece measuring instrument is movable forward and backward so as to freely switch its position. Thus, the workpiece supporting means preferably moves in the lateral direction with respect to the workpiece measuring instrument moved forward, to measure the workpiece. With this configuration, the workpiece measuring instrument can move between a workpiece measuring position inside the machining area and the storage position outside the machining area through simple forward and backward movement, and the position switching means can thus be simplified. Where this configuration is applied to a machine tool such as a spindle-movable lathe which has workpiece supporting means moving in the lateral direction, no new mechanism is required for moving the workpiece supporting means in the lateral direction.

In the present invention, an entrance may be provided in the bed so that the workpiece measuring instrument can move into and out of the bed, and a space portion existing inside the bed can thus be used as the storage position for the workpiece measuring instrument. The interior of the bed is not substantially affected by the cutting heat or heat from any other heat source and is isolated from external atmospheres; it is in a stable, appropriate environment. Thus, when the space portion existing inside the bed is used as the storage position for the workpiece measuring instrument, the workpiece measuring instrument can be kept in more appropriate conditions.

BRIEF DESCRIPTION OF THE DRAWINGS

FIG. 2A is an exploded front view showing the internal structure of the machine tool, and FIG. 2B is an exploded side view of the machine tool.

FIG. 5A is an exploded side view of the workpiece measuring device, and FIG. 5B is an exploded bottom view of the workpiece measuring device.

DETAILED DESCRIPTION OF THE PREFERRED EMBODIMENTS

Figure 1:
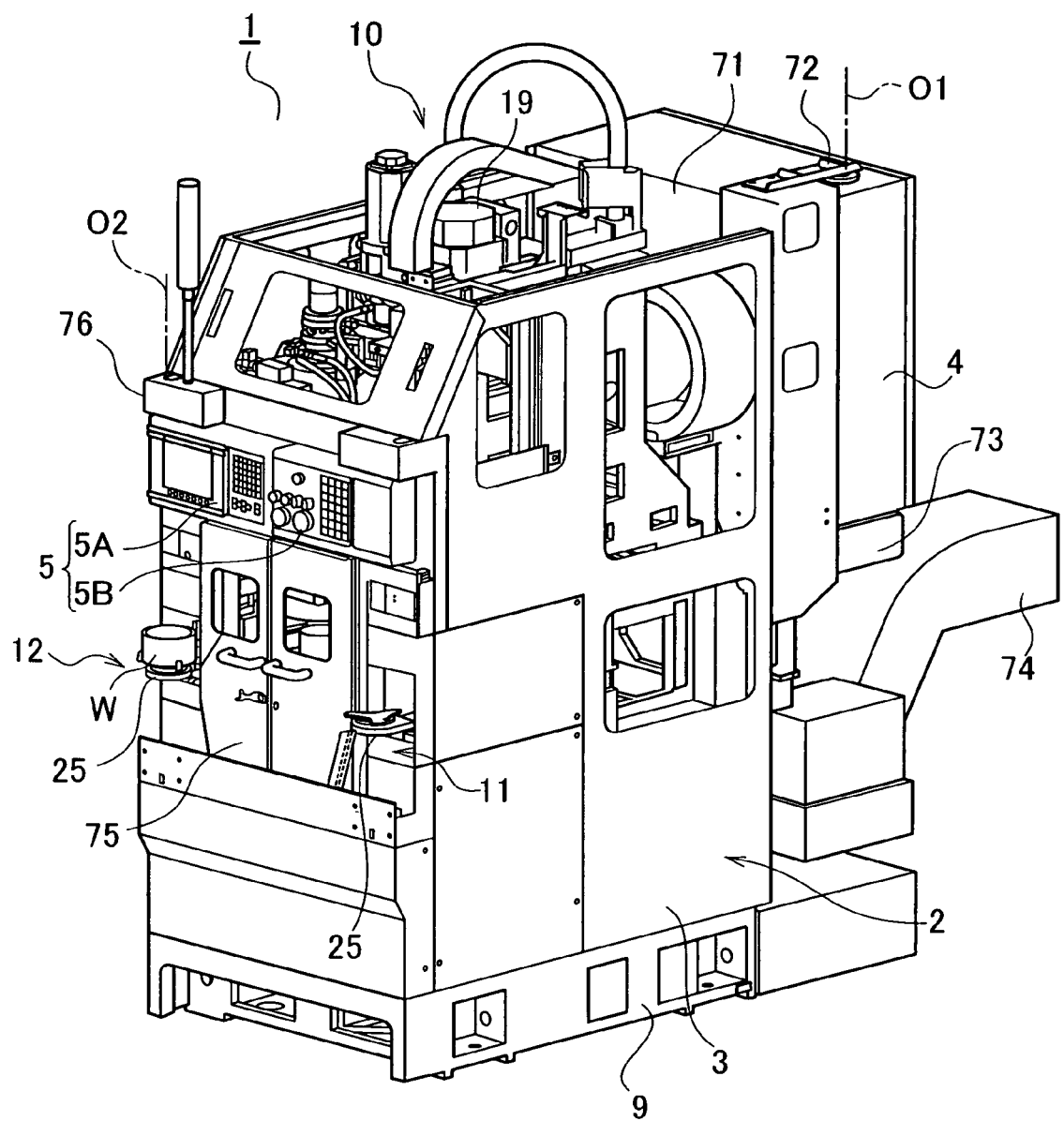
FIG. 1 is a perspective view of a machine tool according to an embodiment of the present invention.
Figure 3:
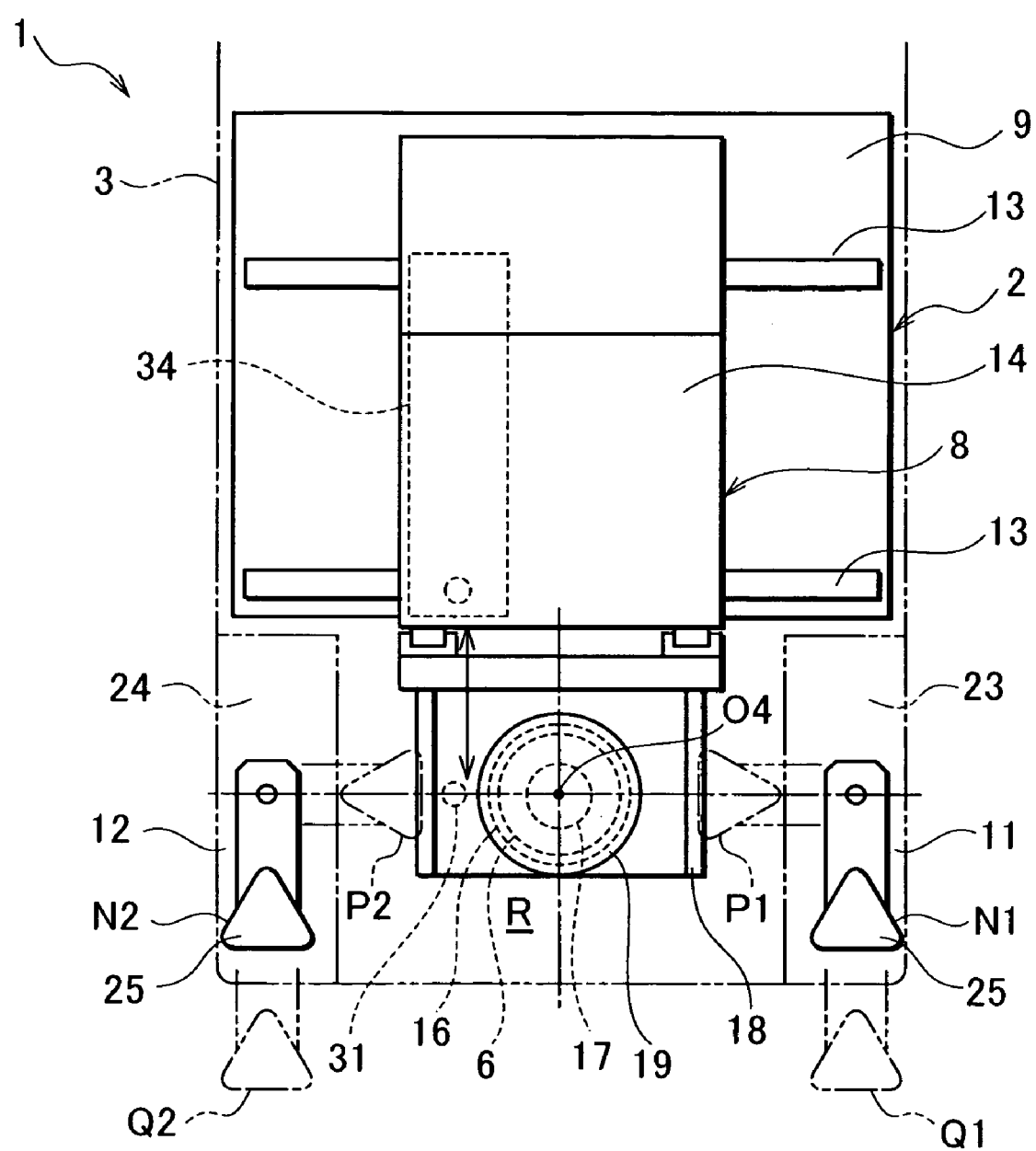
FIG. 3 is an exploded plan view of the machine tool.

An embodiment of the present invention will be described with reference to the drawings. A machine tool according to the present embodiment is a vertical spindle-movable lathe including a control panel and an operation panel. In FIG. 1, a lathe 1, which is the machine tool according to the present embodiment, comprises a machine tool main body 2 including a generally rectangular-parallelepiped frame cover 3 having a vertically long rectangular front portion, a control panel 4 arranged on a rear surface of the machine tool main body 2, and an operation panel 5 arranged on a front portion of the machine tool main body 2.

As shown in FIG. 2, the machines tool main body 2 comprises a spindle chuck 6 serving as workpiece supporting means to support a workpiece W downward, a machining means 7 provided in a machining area R to cut the workpiece W supported by the spindle chuck 6, a spindle moving means 8 for moving the spindle chuck 6 in a vertical and lateral directions, a workpiece carry-in device 11 and a workpiece carry-out device 12 which are provided at different positions in an area in which the spindle chuck 6 is movable in the lateral direction, and a workpiece measuring device 30 that can move into and out of the machining area R. The machining area R is a space in which the workpiece W is machined.

The machine tool main body 2 carries out cutting such as turning by moving the spindle chuck 6 in the vertical and lateral directions with respect to a tool supported at a fixed position by the machining means 7. To achieve this, the spindle moving means 8 and its wiring, piping, and the like constitute a machining equipment 10 placed in a machining equipment installed area S partitioned off from the machining area R. The top, bottom, right, left, and rear portions of the machining area R are surrounded by a machining area cover 70, a bed 9, and a part of the frame cover 3. A opening and closing cover portion 75 described later is provided in the front of the machining area R. Specifically, the bed 9 has a machining means arranging portion 9a in front of a moving seat mount portion 9b; the machining means arranging portion 9a is open at its top so that the machining means 7 can be placed in the machining means arranging portion 9a. The machining area R is surrounded by the four side walls and a bottom wall of the machining means arranging portion 9a and the front surface and both side walls of the machine cover 3, which continue upward from the four side walls of the machining means arranging portion 9a, and the machining area cover 70. The machining area cover 70 is composed of a partitioning cover portion 70a that extends upward from a rear vertical wall 9aa of the machining means arranging portion 9a of the bed 9 to partition the machining area R off from the machining equipment installed area S, and a horizontal slide cover 70b. The slide cover 70b moves in the lateral direction together with a spindle head 16 to keep the top surface of the machining area R closed, and the slide cover 70b is flexible so that its laterally opposite ends can escape upward as it slides.

The spindle moving means 8 comprises a lateral moving seat 14 that is freely movable in the lateral direction on a guide 13 extending in the lateral direction on the bed 9, and the spindle head 16 arranged on the lateral moving seat 14 so as to freely rise and lower via a guide 15 extending in the vertical direction. The spindle chuck 6 is provided at the leading end of a spindle 17 supported on the spindle head 16. The spindle chuck 6 has a plurality of chuck jaws 6a to grip the workpiece W.

Specifically, the spindle head 16 is mounted on a platform 18 arranged on the lateral moving seat 14 so as to freely rise and lower via the guide 15, and a spindle motor 19 arranged on the platform 18 rotationally drives the spindle 17. The spindle head 16 is raised and lowered by an elevation driving source 20 such as a motor which is arranged on the lateral moving seat 14, and a rotation/rectilinear propagation converting mechanism (not shown in the drawings) such as a ball screw which converts rotation of the elevation driving source 20 into vertical motion. The lateral moving seat 14 is moved in the lateral direction by a lateral moving driving source 21 installed in the bed 9 and a rotation/rectilinear propagation converting mechanism (not shown in the drawings) such as a screw which converts rotation of the lateral moving driving source 21 into vertical motion. The elevation driving source 20 is composed of a servo motor or the like and has a position detector 20a such as pulse coder, and the lateral moving driving source 21 is also composed of a servo motor or the like and has position detector 21a such as pulse coder.

The machining means 7 supports a tool 22 such as a byte or a rotary tool which performs a cutting operation, and the machining means 7 is provided with a turret type blade mount 7A and a fixed type blade mount 7B of a comb teeth type or the like. The turret type blade mount 7A is installed on a side wall of the machining area R in front of the bed 9 so as to freely swing around a horizontal axis extending in the lateral direction. The turret type blade mount 7A can swing to index a tool mounted on its peripheral surface but does not have a moving function. The fixed type blade mount 7B is fixedly installed on the front surface of the bed 9 in the machining area R.

The workpiece carry-in device 11 and the workpiece carry-out device 12 are provided in recesses 23, 24, respectively, which are formed on the laterally opposite sides of the front surface of the frame cover 3 and which are open forward. Each of the workpiece carry-in device 11 and the workpiece carry-out device 12 comprises a workpiece mount 25 on which the workpiece W is placed for delivery. The workpiece mount 25 is movable forward and backward between a neutral position N1 (or N2) located in the recess 23 (or 24) and a workpiece supply position Q1 (or a workpiece discharge position Q2) located in front of the neutral position N1 (N2). The workpiece mount 25 is also pivotable between the neutral position N1 (or N2) and a workpiece delivery position P1 (or a workpiece receive position P2) located inside the machining area R.

A description will be given of operations of the workpiece carry-in device 11 and the workpiece carry-out device 12. First, the workpiece W is supplied to the workpiece mount 25 of the workpiece carry-in device 11 located at the workpiece supply position Q1. The workpiece mount 25 moves to the workpiece delivery position P1 via the neutral position N1. The spindle chuck 6 moves in the vertical and lateral directions to pick up the workpiece W from the workpiece mount 25 of the workpiece carry-in device 11, and the workpiece W is then turned by the machining means 7. The workpiece carry-in device 11 then delivers the workpiece W to the workpiece mount 25 of the workpiece carry-out device 12 located at the workpiece receive position P2. The workpiece mount 25 of the workpiece carry-out device 12 having received the workpiece W moves through the neutral position N2 to the workpiece discharge position Q2, where the workpiece W is discharged.

As shown in FIGS. 4A to 5B, the workpiece measuring device 30 is composed of a touch type workpiece measuring instrument 31 such as a touch sensor, position switching means 32 for moving the workpiece measuring instrument 31 forward and backward between a measurement position A inside the machining area R and a storage position B outside the machining area R, and measurement loading means 33. The storage position B corresponds to a space portion 34 existing inside the bed 9. The measurement loading means 33 loads position signal from a position detector 20a of the elevation driving source 20 and a position detector 21a of the lateral moving driving source 21 when the workpiece measuring instrument 31 is turned on. To switch its position, the workpiece measuring instrument 31 moves into or out of the machining area R through an entrance 35, formed in the vertical wall 9aa of the bed 9. An opening and closing cover 36 is attached to the entrance 35, and opens and closes in unison with the position switching of the workpiece measuring instrument 31.

Figure 6:
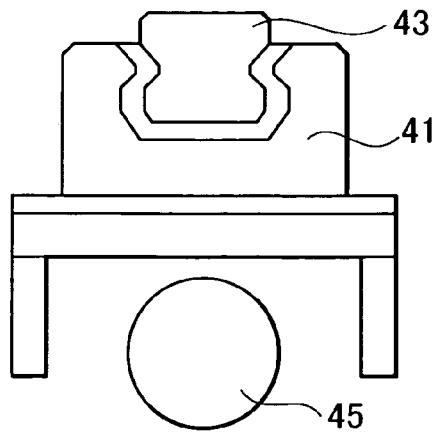
FIG. 6 is a sectional view taken along the direction of arrow X in FIG. 5A with a part of the workpiece measuring device omitted.

The position switching means 32 will be described. A fixing bracket 40 is horizontally provided in the space portion 34, and a linear bearing 41 is provided on the fixing bracket 40 in a front-to-back direction and is guide means having a U-shaped cross section with its top open. On the other hand, a guide 43 extending in the front-to-back direction is integrally attached to a measuring instrument support frame 42 that supports the workpiece measuring instrument 31 upright, and the guide 43 is slidably fitted into the linear bearing 41. As shown in FIG. 6, the guide 43 has a cross section with the right and left surfaces of its vertically middle portion recessed inward. A roller (not shown in the drawings) of the linear bearing 41 engages with the recesses of the guide 43 to prevent the guide 43 from slipping off upward from the linear bearing 41. A position switching cylinder 45 is provided below the fixing bracket 40. The front end of a piston rod 45a of the cylinder 45 is coupled to a first plate member 46 fixed to the measuring instrument support frame 42. Thus, expansion or contraction of the cylinder 45 moves the workpiece measuring instrument 31 forward or backward together with the measuring instrument support frame 42 while being guided by the linear bearing 41 and a guide mechanism of the guide 43.

The opening and closing cover 36 is opened and closed by pivoting around a pivotable center shaft 36a extending in the vertical direction. A mechanism for opening and closing the opening and closing cover 36 is an interlocking mechanism 48 that operates in unison with the position switching of the workpiece measuring instrument 31. The interlocking mechanism 48 is a link mechanism having a link 49 that couples a protruding piece 36b formed on an inner side of the opening and closing cover 36 to a second plate member 47 fixed to the measuring instrument support frame 42. The interlocking mechanism 48 operates so that the opening and closing cover 36 is closed when the workpiece measuring instrument 31 is located at the storage position B, is opened as the workpiece measuring instrument 31 moves forward from the storage position B, and is closed as the workpiece measuring instrument 31 moves backward from the measurement position A.

Figure 7:
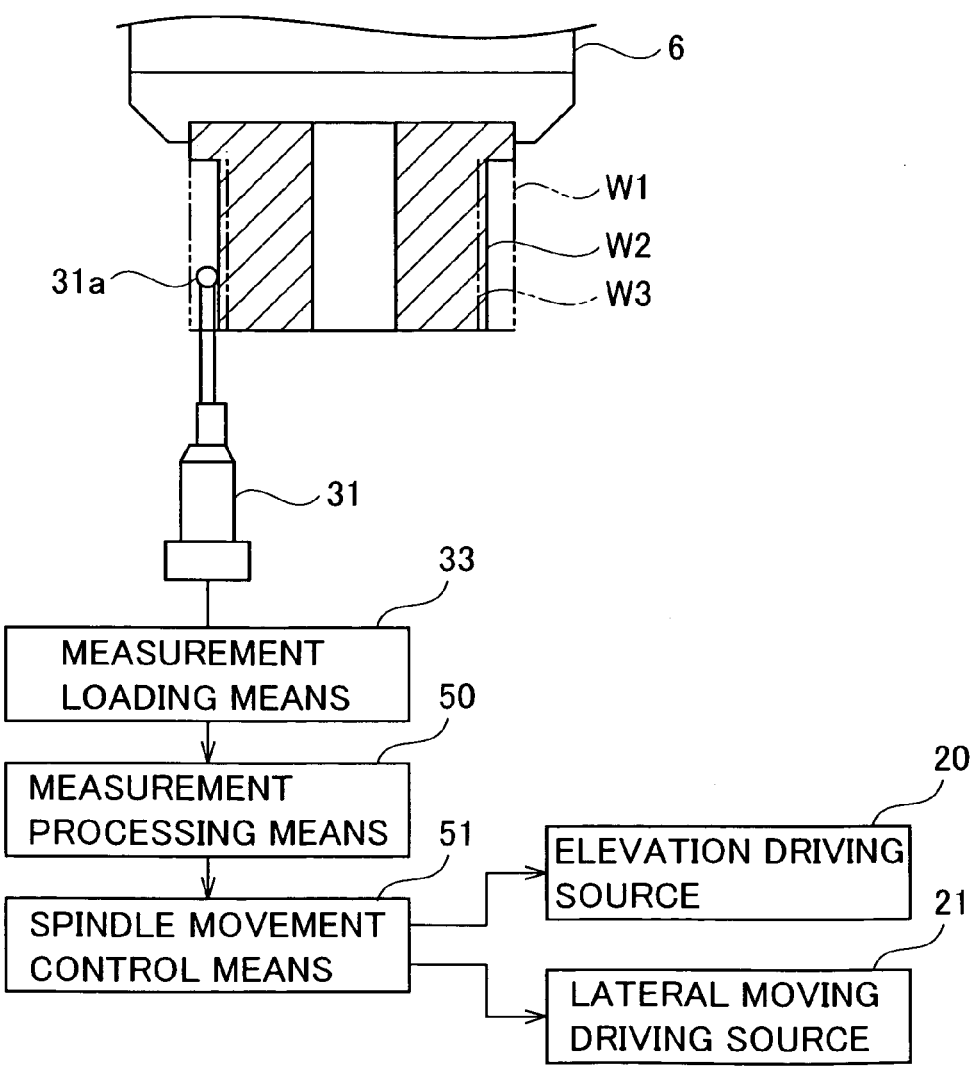
FIG. 7 is a diagram illustrating a combination of a diagram showing a workpiece measuring state and a block diagram of a control system.

Now, the operation of the workpiece measuring device 30 will be described taking the case in which the workpiece is cut in two stages: rough cutting and finish cutting. The elevation driving source 20 and the lateral moving driving source 21 are operated to move the spindle chuck 6 in the vertical and lateral directions, and the workpiece W held by the spindle chuck 6 is turned by the machining means 7 (see FIG. 7). In a first stage, a material workpiece W1 is roughly turned so that the dimensions of the workpiece W1 become close to target values. W2 denotes the roughly machined workpiece.

Figure 4A:
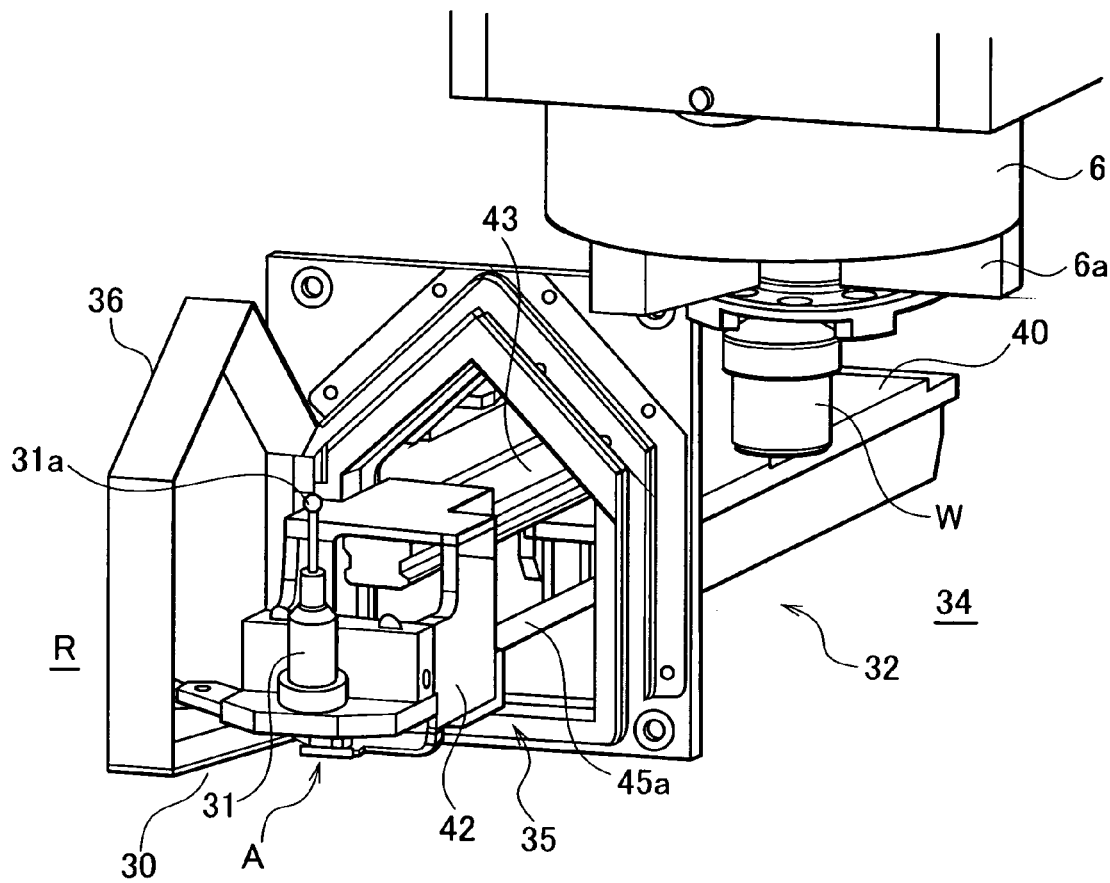
FIG. 4A is a perspective view showing a state of a workpiece measuring device.
Figure 4B:
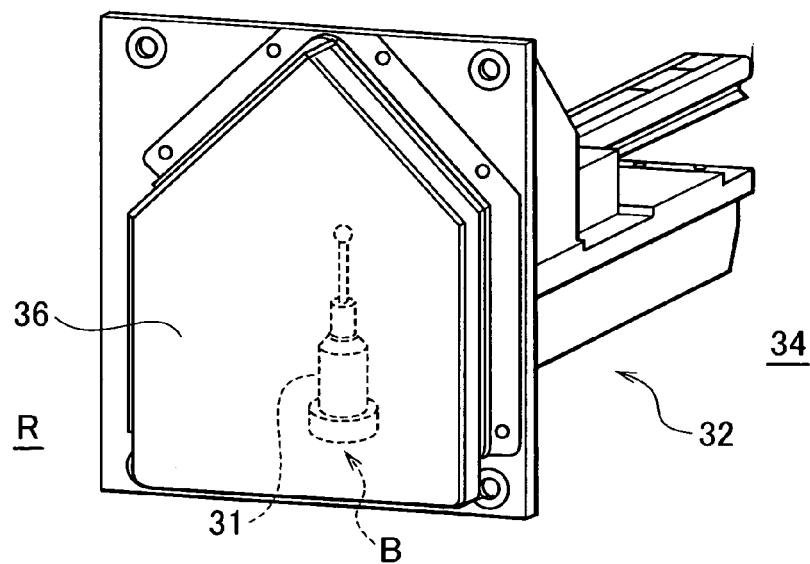
FIG. 4B is a perspective view showing a different state of the workpiece measuring device.

Once the rough machining is finished, the opening and closing cover 36 is opened and the workpiece measuring instrument 31 moves forward to the measurement position A as shown in FIG. 4A. The spindle chuck 6 moves in the lateral direction with respect to the workpiece measuring instrument 31 located at the measurement position A, and this brings a detection terminal 31a of the workpiece measuring instrument 31 into contact with a machined surface of the workpiece W2. Contacting the detection terminal 31a with the machined surface of the workpiece W2 turns on the workpiece measuring instrument 31, and the measurement loading means 33 reads positional information from the position detector 21a of the lateral moving means 21 to measure the dimension of the workpiece W2. After the measurement is finished, the spindle chuck 6 moves in the lateral direction to move the workpiece W2 off from the workpiece measuring instrument 31. Then, as shown in FIG. 4B, the workpiece measuring instrument 31 moves backward to the storage position B to close the opening and closing cover 36.

Measurement processing means 50 compares the measurement loaded by the measurement loading means 33 with a predetermined reference value or the last measurement. The measurement processing means 50 thus calculates a feed correction amount for the spindle chuck 6 for finish cutting. The correction amount is then sent to spindle movement control means 51. The spindle movement control means 51 uses the correction amount to correct the control value for finish cutting. The spindle movement control means 51 then controls the elevation driving source 20 and the lateral moving driving source 21 on the basis of the corrected control value to perform the second stage operation, that is, finish cutting. W3 denotes the finish-cut workpiece. Even after the finish cutting is finished, the workpiece measuring instrument 31 moves forward to the measurement position A to measure the dimension of the workpiece W3 as previously described. This measurement determines whether or not the workpiece has been finish-cut appropriately. In the above description, the workpiece diameter is measured. However, the length of the workpiece can also be measured by causing the elevation driving source 20 to raise or lower the workpiece W and obtaining a detection value from the position detector 20a when the workpiece measuring instrument 31 is turned on.

In FIG. 1, the frame cover 3 has a rear opening 71 in its rear surface through which an operator can enter the frame cover 3 for maintenance of the machining equipment 10 or the like. The control panel 4 closes the rear opening 71. The control panel 4 is supported by an upper and lower support members 72, 73 extending backward from the frame cover 3 so that the control panel 4 is pivotable around a vertical axis 01 to open or close the rear opening 71. The control panel 4 is provided in the upper part of the frame cover 3, and a chip conveyor 74 is placed below the control panel 4 so as to be retractable backward.

An opening and closing cover portion 75 is provided in the widthwise center of the front surface of the frame cover 3 so that the operator can enter the machine through the opening and closing cover portion 75. The operation panel 5 can be switched between a position over the opening and closing cover portion 75 and a retracted position where the operation panel 5 is retracted from the position over the opening and closing cover portion 75. The operator puts the upper part of the body in the machine through the opening and closing cover portion 75 for maintenance of the machine or the like (setup for chucks or tools). The operation panel 5 is divided into a right and left operation panel portions 5A, 5B each supported by a bracket 76 of the frame cover 3 so as to be pivotable around a vertical swing axis 02.

While the workpiece W is not being machined by the machine tool 1 comprising the workpiece measuring instrument 31, the workpiece measuring instrument 31 is located at the measurement position A inside the machining area R to measure the workpiece near the machining position. During workpiece machining, the workpiece measuring instrument 31 is retracted to the storage position B outside the machining area R so as not to be affected by chips or cutting heat. This enables the workpiece measuring instrument 31 to be always kept in appropriate conditions to achieve precise measurements. The durability of the workpiece measuring instrument 31 can also be improved.

The spindle chuck 6, which is a workpiece supporting means, moves in the lateral direction with respect to the workpiece measuring instrument 31 moved forward to the measurement position A to measure the workpiece. The workpiece measuring instrument 31 can thus move between the measurement position A inside the machining area R and the storage position B outside the machining area R through simple forward and backward. This simplifies the configuration of the position switching means 32. Where the storage position B corresponds to the space portion 34, provided inside the bed 9, the workpiece measuring instrument 31 only moves forward and backward in the space portion 34; it is smaller than a space portion in which the workpiece measuring portion 31 moves in the lateral direction and is stored, and this configuration also reduces the size of the entrance 35. The present embodiment relates to a spindle-movable lathe in which the spindle chuck 6 moves in the vertical and lateral directions. This eliminates a lateral moving mechanism otherwise provided in the workpiece measuring instrument 31 to measure the workpiece.

Further, the storage position B for the workpiece measuring instrument 31 corresponds to the space portion 34, which exists inside the bed 9; the interior of the bed 9 is in a stable, appropriate environment because it is not substantially affected by cutting heat during cutting or heat from any other heat source (for example, the spindle motor 19) and is isolated from external atmospheres. This makes it possible to keep the workpiece measuring instrument 31 in more appropriate conditions. In particular, the present embodiment has the opening and closing cover 36, which shuts out the space portion 34 from the machining area R. This makes the environment of the space portion 34 more appropriate. Further, even near the machining area R in the space portion 34, the workpiece measuring instrument 31 is not substantially affected by heat from the machining area R. This eliminates the need to locate the storage position B remotely from the machining area R. The forward and backward moving stroke of the workpiece measuring instrument 31 can thus be reduced to simplify the position switching means 32.

In the present embodiment, the machine tool is a vertical spindle-movable lathe. However, the present embodiment is applicable to other machine tools.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A machine tool with a workpiece measuring instrument having a bed and a cover that surrounds a machining area, comprising:
   a workpiece supporting means relatively movable to a workpiece;
   a machining means for machining the workpiece supported by the workpiece supporting means;
   a workpiece measuring instrument that measures the dimensions of the machined workpiece;
   a position switching means for switching the workpiece measuring instrument between a measuring position inside the machining area and a storage position outside the machining area, wherein for measuring the workpiece, the workpiece supporting means is movable in a lateral direction after the workpiece measuring instrument supported on a measuring instrument support frame is moved into its measuring position;
   a space portion in the bed for receiving the workpiece measuring instrument in the storage position; and
   an opening and closing cover is attached at the entrance of the space portion that opens when the workpiece measuring instrument is located at the measurement position and closes when the workpiece measuring instrument is located in the storage position.

2. A machine tool with a workpiece measuring instrument according to claim 1, wherein said entrance is provided in the bed so that the workpiece measuring instrument can move into and out of the bed, and said space portion existing inside the bed is used as the storage position for the workpiece measuring instrument.

3. An operating method for a machine tool with a workpiece measuring instrument, wherein the machine tool is composed of:
   a bed;
   a cover that surrounds a machining area; and
   workpiece supporting means, machining means for machining a workpiece supported by the workpiece supporting means, a workpiece measuring instrument that measures the dimensions of the machined workpiece, and position switching means for switching the workpiece measuring instrument between a position inside the machining area and a storage position outside the machining area, wherein the workpiece supporting means and the machining means provided in the machining area,
   wherein the workpiece supporting means is movable in a lateral direction, the workpiece measuring instrument is movable forward and backward so as to freely switch its position, and the workpiece supporting means moves in the lateral direction with respect to the workpiece measuring instrument moved forward to measure the workpiece, the method being characterized by comprising:
   when the workpiece measuring instrument is located at the storage position, moving the workpiece supporting means in the lateral direction and allowing the machining means to roughly machine the workpiece;
   moving the workpiece measuring instrument from the storage position to a measurement position inside the machining area to which the workpiece supporting means is movable, and setting the workpiece measuring instrument at the measurement position;
   moving the workpiece supporting means in the lateral direction and measuring the dimensions of the roughly machined workpiece;
   moving the workpiece measuring instrument from the measurement position to the storage position and setting the workpiece measuring instrument at the storage position; and
   on the basis of the measured dimensions of the roughly machined workpiece, moving the workpiece supporting means in the lateral direction, and allowing the machining means to finish-machine the workpiece.

* * * * *